United States Patent Office 3,407,076
Patented Oct. 22, 1968

3,407,076
PROTEIN-POLYMER COMPLEXES AND PROCESS
Alexander J. Ganz, Wilmington, Del., assignor to Hercules Incorporated, a corporation of Delaware
No Drawing. Filed Aug. 28, 1964, Ser. No. 392,913
9 Claims. (Cl. 99—139)

ABSTRACT OF THE DISCLOSURE

A water-soluble globulin anionic polyelectrolyte complex useful in the preparation of whipped toppings made by reacting a water soluble anionic polyelectrolyte with a globulin in a ratio of at least 1–3.5 and at a pH of 2.5 or above.

---

This invention relates to globulin-polymer complexes comprising the reaction product of those proteins known as globulins and water-soluble anionic polyelectrolytes, a method of making said complexes, and products comprising said complexes, said polyelectrolyte sometimes being called polymer herein.

The term "complex" as used herein with reference to the reaction product of a globulin and an anionic polyelectrolyte is used to indicate interaction between the globulin molecules and the anionic polyelectrolyte molecules. However, it is not intended to limit the invention to any specific theory since the exact theory or mechanism for the formation and structure of the complexes is not known with sufficient certainty.

Proteins which are insoluble in water at their isoelectric point are classified as globulins. As used herein the term "isoelectric point" means the pH at which a globulin will not migrate to either the cathode or anode when a direct current is passed through an aqueous suspension or dilute salt solution of the globulin. This does not imply, however, that the globulin is uncharged at this pH. It simply means that the positive charges are balanced by the negative charges. As used herein, the term "isoelectric region" means the pH region defined by a pH somewhat below to a pH somewhat above the isoelectric point.

Globulins as they occur in nature are nondenatured. Denaturation is a structural change which may be brought about by one of several factors, e.g., by adding organic solvents or salts such as urea to an aqueous solution of the globulin, or by applying to the globulin physical forces such as heat and pressure. Among the manifestations of denaturation is decreased solubility.

The term "anionic polyelectrolyte" used herein means negatively charged, water-soluble ionic polymers. Any of the water-soluble anionic polyelectrolytes can be used in accordance with this invention. Examples of these include (1) carboxyalkyl ethers of cellulose, starch, amylose, amylopectin and natural gums, e.g. carboxymethylcellulose, carboxymethyl starch, carboxymethyl amylose, carboxymethyl amylopectin, carboxymethyl guar gum, carboxymethyl locust bean gum, (2) anionic natural gums, e.g. carrageenin, (3) cellulose sulfate and (4) salts of alginic acid, e.g. sodium alginate. Proteins and starch are not anionic polyelectrolytes.

Globulins are widely used in many diverse commercial applications. Their use has been restricted, however, since they are insoluble in aqueous solution at pH's within the isoelectric region of the globulin, and are furthermore subject to denaturation by heat at elevated temperatures. Several methods of improving the solubility characteristics of globulins have been proposed in the art. In general, they involve chemical reaction and/or modification of the globulin structure in one manner or another. Although the prior art methods will normally improve the solubility characteristics of globulins, any improvement is at the sacrifice of the desirable natural properties of the globulin. Thus, chemically reacting or modifying globulins by prior art methods renders them less useful in some applications.

An object of this invention is to provide globulin-polymer complexes and a method of making said complexes from globulins and water-soluble anionic polyelectrolytes. Another object is to provide globulin-polyelectrolyte complexes which are soluble in aqueous solution and which are not denatured by heat. Still another object is to provide globulin-polyelectrolyte complexes wherein the beneficial properties of the globulins are retained.

The above and other objects are accomplished according to this invention by carrying out the process which comprises reacting a globulin with a water-soluble anionic polyelectrolyte in an aqueous medium. The resulting aqueous complex may be dried to obtain a dry, water-soluble globulin-polyelectrolyte complex.

It has been found that the process of this invention gives a globulin-polyelectrolyte complex that is both water-soluble and unaffected by protein denaturation conditions. Complexing globulins and water-soluble anionic polyelectrolytes in accordance with this invention renders the globulin useful under conditions where globulins which are not complexed are inoperable, i.e. at pH's within the isoelectric region of the globulin and at elevated temperatures; and the globulin-polyelectrolyte complexes of this invention retain the beneficial properties of the original globulins.

Although this invention is applicable to globulins and water-soluble anionic polyelectrolytes generally, for the sake of clarity and simplicity the invention will be described in large part hereinafter with reference to soy globulin and carboxymethylcellulose. The term "CMC" herein means the alkali metal and ammonium salts of carboxymethylcellulose.

Several types of carboxymethylcellulose were used in the examples given hereinafter. These had different viscosity and D.S. ranges. In order to simplify presentation of the examples, the viscosity and D.S. ranges of the CMC types used are given in Table 1 hereinafter, the CMC types in this Table 1 and elsewhere herein being designated merely as CMC–A, CMC–B and CMC–C. These are commercial products presently available as Hercules Powder Company CMC–7HSP, CMC–4HP and CMC–12HP, respectively. These and all viscosities herein, unless otherwise indicated, were measured on a 1% aqueous solution at 25° C. with a Brookfield standard Synchro-Lectric viscometer.

TABLE 1

| CMC | Viscosity,* cps. | D.S. Range |
|---|---|---|
| A | 1,300 to 2,200 | 0.65 to 0.95. |
| B | 1,300 to 2,200 | 0.38 to 0.48. |
| C | 100 to 300 | 1.2 to 1.4. |

*At pH 6.8.

D.S. as used herein means degree of substitution. There are three hydroxyl groups in each anhydroglucose unit in the cellulose molecule. D.S. is the average number of hydroxyl groups substituted in the cellulose per anhydroglucose unit.

The following examples illustrate specific embodiments of the present invention but they are not intended to limit the invention beyond the scope of the appended claims. In the examples, and elsewhere herein percent, ratios and parts are by weight unless otherwise indicated.

In Table 2 hereinafter the 25° C. column means the aqueous globulin solutions or dispersions were prepared at 25° C. and solubility observations made at 25° C. The 95° C. column means the aqueous globulin solutions or dispersions were prepared at 25° C., heated to 95° C. and then cooled to 25° C. and then the solubility observations made at 25° C.

TABLE 2

Water Solubility of the Globulins Used in the Examples

| pH | Soy Globulin [1] | | Casein [1] | | Edestin [1] | |
|---|---|---|---|---|---|---|
| | 25° C. | 95° C. | 25° C. | 95° C. | 25° C. | 95° C. |
| 7 | sol. | sol. | sol. | sol. | sol. | sol. |
| 6 | sol. | insol. | sol. | sol. | sol. | sol. |
| 5.5 | sol. | insol. | sol. | sol. | sol. | sol. |
| 5 | insol. | insol. | insol. | insol. | insol. | insol. |
| 4.5 | insol. | insol. | insol. | insol. | insol. | insol. |
| 3.5 | insol. | insol. | insol. | insol. | insol. | insol. |
| 2.5 | sol. | sol. | sol. | sol. | sol. | sol. |

[1] 0.5% in water.

Example 1.—Complexing within the isoelectric region

The following procedure was used to prepare the soy globulin-CMC complexes and demonstrate their solubility. 1 part of soy globulin was added to 99 parts water at 25° C. and pH 4.5 while stirring. The soy globulin did not dissolve but remained in suspension. 1 part of CMC was added to 99 parts water at 25° C. and pH 4.5 while stirring. The aqueous CMC solution and the aqueous soy globulin suspension were then combined while stirring and in all cases a water-soluble soy globulin-CMC complex formed immediately. Aliquots of the aqueous complex solution were adjusted to pH 2.5, 3.5, 4.5, 5, 5.5, 6 and 7, and the soy globulin-CMC complexes remained in solution. Each of the 7 aliquots were then divided into two portions, 1 and 2. Portion 1 of the complexes at each pH was then heated to 95° C. and allowed to cool to 25° C. The soy globulin-CMC complexes remained in solution throughout the heating and also when the solutions were cooled to 25 °C. Results and further details appear in Tables 3 and 4 hereinafter.

The following experiments show that the complexes retain their solubility in water even after drying.

TABLE 3 (EXAMPLE 1)

Water Solubility of Complexes of Soy Globulin and CMC in Water at 25° C.

| pH | Soy Globulin [1] | Complex of Soy Globulin [2] and— | | |
|---|---|---|---|---|
| | | CMC-A | CMC-B | CMC-C |
| 7 | sol. | sol. | sol. | sol. |
| 6 | sol. | sol. | sol. | sol. |
| 5.5 | sol. | sol. | sol. | sol. |
| 5 | insol. | sol. | sol. | sol. |
| 4.5 | insol. | sol. | sol. | sol. |
| 3.5 | insol. | sol. | sol. | sol. |
| 2.5 | sol. | sol. | sol. | sol. |

[1] 0.5%. [2] 1.0% (half globulin, half CMC).

TABLE 4 (EXAMPLE 1)

Water Solubility of Complexes of Soy Globulin and CMC in Water After Heating to 95° C. and Cooling to 25° C.

| pH | Soy Globulin [1] | Complex of Soy Globulin [2] and— | | |
|---|---|---|---|---|
| | | CMC-A | CMC-B | CMC-C |
| 7 | sol. | sol. | sol. | sol. |
| 6 | insol. | sol. | sol. | sol. |
| 5.5 | insol. | sol. | sol. | sol. |
| 5 | insol. | sol. | sol. | sol. |
| 4.5 | insol. | sol. | sol. | sol. |
| 3.5 | insol. | sol. | sol. | sol. |
| 2.5 | sol. | sol. | sol. | sol. |

[1] 0.5%. [2] 1.0% (half globulin, half CMC).

Portion 1 (heated to 95° C. and then cooled to 25° C.) of the complexes at each pH was then pan dried separately; the dried complexes were redissolved in water at pH 4.5 and they remained in solution. Portion 2 (unheated) of the complexes at each pH was likewise dried and redissolved in water at pH 4.5 and they also remained in solution.

Examples 2 and 3.—Water solubility of complexes of various globulins and CMC in water These examples were carried out using the same conditions as were used in Example 1 except that casein and edestin were used instead of the soy globulin of Example 1. The water solubility was determined of the complexes CMC-A, CMC-B, and CMC-C with (1) casein and (2) edestin. In Examples 2 and 3 the same results were obtained as in Example 1.

Example 4.—Complexing outside the isoelectric region

Examples 1–3 were repeated except the complex was formed at pH 7 (i.e. outside the isoelectric region). The solubility results were not affected by forming the complex at pH 7 and then subjecting it to the procedures of Examples 1, 2 and 3. The solubility results of the complexes prepared in this Example 4 were the same as those given in Examples 1–3 hereinbefore where the complex was formed at a pH within the isoelectric region of the globulin.

Examples 5–10

Examples 5–10 show that the total solids content of the complexes of this invention (soy globulin plus CMC) is not critical. The following procedure was used in these examples. Soy globulin was added to water at pH 4.5 and it remained in suspension. The CMC was added to water and the pH adjusted to 4.5. The CMC solution was added to the aqueous soy globulin suspension while stirring and the complexes formed immediately. In all these examples, the CMC/globulin ratio was 1/1. Results and further details are given in Table 5 hereinafter.

TABLE 5

| Example | Total, Solids, Percent [1] | Water Solubility of Soy Globulin-CMC-A Complexes |
|---|---|---|
| 5 | 0.01 | sol. |
| 6 | 0.10 | sol. |
| 7 | 0.5 | sol. |
| 8 | 2.0 | sol. |
| 9 | 3.0 | sol. |
| 10 | 5.0 | sol. |

[1] I.e., percent complex in water.

Examples 11–13

Examples 11–13 show that there is a minimum amount of CMC based on the weight of soy globulin which must be present to effect the formation of a complex. These examples also show that there is no apparent maximum amount of CMC which may be employed since satisfactory results were still being obtained at a 20/1 CMC/soy globulin ratio. In Examples 11–13, the following procedure was used. The soy globulin was added to water at 25° C. and pH 4.5. The soy globulin did not dissolve but remained in suspension. The CMC-A solution (preadjusted to pH 4.5) was added to the suspension of soy globulin. The total solids content (globulin plus CMC) was 1% in each example. Results and further details are given in Table 6 hereinafter.

TABLE 6

| Example | CMC-A/Soy Globulin Ratio | Water Solubility of Soy Globulin-CMC-A Complexes |
|---|---|---|
| 11 | 1/4 | insol. |
| 12 | 1/3.5 | sol. |
| 13 | 20/1 | sol. |

Examples 11–13 hereinbefore were repeated at a total solids content of 0.5% with substantially the same results.

Examples 14–18.—Water solubility of complexes of soy globulin and CMC in water at 25° C. and various pH's Attempts were made to complex a 0.5% CMC–A aqueous solution with a 0.5% soy globulin aqueous solution at pH 2, 2.5, 5.5, 6 and 7. The viscosity of each of the resulting five complex solutions was determined and compared with five aqueous solutions containing 0.5% CMC–A alone at these pH's. Further details appear in Table 7 hereinafter. These data show that pH 2 is too low for adequate formation of the complex but that pH 2.5 is high enough to properly form the complex. At pH 2, the viscosity of the mixture was substantially lower than the viscosity of the CMC–A alone, thus showing that the product was not sufficiently soluble in water and therefore that no substantial amount of water-soluble complex was formed. Although there was complexing at pH 7, the degree of complexing was substantially less than in the pH range of 2.5–6.

TABLE 7 (EXAMPLES 14-18)

(Water Solubility of Complexes of Soy Globulin and CMC in Water at 25° C. and Various pH's)

| Example | pH | 0.5% CMC-A (cps.) | 0.5% CMC-A/0.5% Soy Globulin Complex (cps.) |
|---|---|---|---|
| 14 | 2 | 88 | 53 |
| 15 | 2.5 | 80 | 180 |
| 16 | 5.5 | 145 | 365 |
| 17 | 6 | 170 | 200 |
| 18 | 7 | 184 | 200 |

Although the foregoing examples represent the preferred ways of practicing the present invention, many variations may be made within the scope of the invention, and most of these will now be obvious to those skilled in the art. The more important of these variables will now be discussed.

It will be noted that the CMC used in the examples represent a D.S. range of 0.38 to 1.4, the D.S. per se having no substantial effect on the results. Of course, the polyelectrolyte must be substantially completely soluble in water. It is well known that in order for CMC to be substantially soluble in water the D.S. must be about 0.3 or greater.

Although the relative amounts of polyelectrolyte and globulin in the aqueous preparations are critical the only factor of significance in this regard is the minimum amount. In order to form the soy globulin-CMC complexes of this invention one must use a ratio of CMC to soy globulin of at least 1/3.5. Any ratios higher than this are applicable.

Likewise, when complexing other globulins with other water-soluble anionic polyelectrolytes, the relative amounts of anionic polyelectrolyte to globulin are critical in regard to the minimum amount of anionic polyelectrolyte based on the weight of the globulin. In general, the ratio of anionic polyelectrolyte to globulin for complexes formed in accordane with this invention must be about 1/3.5 although the exact ratio will vary somewhat depending on both the particular anionic polyelectrolyte and the particular globulin used.

The temperature at which the globulin-polyelectrolyte complexes are formed in accordance with this invention is not critical. Of course one must operate at a temperature below that which would denature the globulin since once the native structure of the globulin is altered, its addition to an aqueous medium containing a water-soluble anionic polyelectrolyte will not form a complex.

It has been found that the minimum pH at which the globulin and polyelectrolyte are combined in an aqueous medium in accordance with this invention is critical and must be at least 2.5.

Another method, in addition to that use in the examples hereinbefore, of mixing the polyelectrolyte and globulin in accordance with this invention is to add both the polyelectrolyte and the globulin in the dry state to water either together or separately in any order.

The aqueous solutions in which the globulin-polyelectrolyte complexes of this invention are formed or in which the dry powder globulin-polyelectrolyte complexes are redissolved may contain other substances which are without effect on the complex. These other substances may include, e.g., sugar, starch, salts chemically inert to globulin and polyelectrolyte or to the complex.

Any globulin (both simple and conjugated) may be solubilized in accordance with this invention, including by way of example and without limitation, soy globulin, edestin and casein. Casein is a conjugated protein, i.e. it contains in addition to the protein part an additional nonprotein prosthetic group. For the purposes of this invention, casein is considered to be a globulin protein in view of its insolubility in water at its isoelectric point.

Although good results have been obtained with pan drying, other types of drying may be used. These include, e.g., oven drying, drum drying, spray drying and freeze drying. The drying temperature and drying time are not critical and may be varied so long as the desired degree of drying is obtained. The pH at which the aqueous complexes are dried is not critical. The dried globulin-polyelectrolyte complexes of this invention readily redissolve in aqueous solutions even at a pH within the isoelectric region of the globulin regardless of the pH of drying and regardless of whether the pH of the aqueous complex was ever within the isoelectric region of the globulin.

The instant invention possesses a number of outstanding advantages. The addition of the polyelectrolyte to an aqueous solution of a globulin at a pH outside the isoelectric region will complex with the globulin and prevent precipitation of the globulin when the pH of the solution is brought within the isoelectric region of the globulin. In the same manner, the addition of the polyelectrolyte to a suspension of globulin in water at a pH within the isoelectric region of the globulin will complex with and thus solubilize the globulin. Furthermore, the complexes of this invention are protected against denaturation, e.g. the complexes will not precipitate out of solution at elevated temperatures. Thus it is apparent that this invention provides both an extended pH range and an extended temperature range over which globulins can be utilized and without loss of their beneficial properties.

The complexes of this invention have numerous uses wherein the benefits of this invention are realized. They have been successfully tried in a number of applications including new and improved products, e.g. in the preparation of icings and in cheese spreads that do not curdle. One such application was in whipped toppings (Example 19 hereinafter). Whipped toppings are products based on vegetable fat and emulsifier, and they generally contain a protein as a whipping aid. When no protein is present the product tends to have an unpleasant mouthfeel. When globulin is present the product may not be usable in acid media, e.g. in the presence of fruit juices, because of curdling or precipitation of the protein. Sufficiently modifying the globulin to prevent curdling renders it less effective as a whipping aid.

Example 19.—Whipped topping base

| Ingredients: | Percent |
|---|---|
| Solution I (pH 6.8)— | |
|   Water | 25 |
|   CMC–A | 0.25 |
| Solution II (pH 6.8)— | |
|   Water | 25 |
|   Casein | 0.75 |
|   Sugar | 15 |
|   Salt | 0.01 |
|   Potassium sorbate | 0.10 |
|   Hydrogenated shortening | 33.14 |
|   Emulsifier (monodiglyceride) | 0.75 |

In this Example 19 the whipped topping base was prepared as follows. The aqueous CMC Solution I and the aqueous casein Solution II were combined to form the casein-CMC complex. The remaining ingredients shown were added and the pH of the resulting mixture was adjusted to 4.5. The mixture was pasteurized at 160° F. for 30 minutes, homogenized at 1500 p.s.i. and then cooled rapidly to 40° F. with slow stirring. The whipped topping base thus prepared was characterized by excellent stability.

As many apparent and widely different embodiments of this invention may be made without departing from the spirit and scope thereof, it is to be understood that the invention is not limited to the specific embodiment thereof except as defined in the appended claims.

What I claim and desire to protect by Letters Patent is:

1. A water soluble protein-polymer complex comprising the reaction product of a globulin and a water-soluble anionic polyelectrolyte, the anionic polyelectrolyte/globulin ratio being at least about 1/3.5 reacted at a minimum pH of at least about 2.5, the anionic polyelectrolyte/globulin ratio employed being at least about 1/3.5.

2. The complex of claim 1 wherein said globulin is soy protein.

3. The complex of claim 1 wherein said anionic polyelectrolyte is carboxymethylcellulose.

4. A water soluble protein-polymer complex comprising the reaction product of a globulin selected from the group consisting of soy protein, edestin and casein and a water-soluble anionic polyelectrolyte selected from the group consisting of carboxymethylcellulose, carboxymethyl starch, carrageenin and sodium alginate, the anionic polyelectrolyte/globulin ratio being at least about 1/3.5 reacted at a minimum pH of at least about 2.5, the anionic polyelectrolyte/globulin ratio employed being at least about 1/3.5.

5. Process for producing a water soluble protein-polymer complex which comprises mixing together at a minimum pH of at least about 2.5 a globulin, a water-soluble anionic polyelectrolyte and water, the anionic polyelectrolyte/globulin ratio employed being at least about 1/3.5.

6. Process as defined in claim 5 wherein said globulin is soy protein.

7. Process as defined in claim 5 wherein said anionic polyelectrolyte is carboxymethylcellulose.

8. Process of producing a water soluble protein-polymer complex which comprises mixing together at a minimum pH of at least about 2.5 (1) a globulin selected from the group consisting of soy protein, edestin and casein, (2) a water-soluble anionic polyelectrolyte selected from the group consisting of carboxymethylcellulose, carrageenin, carboxymethyl starch and sodium alginate, and (3) water, the anionic polyelectrolyte/globulin ratio employed being at least about 1/3.5.

9. A whipped topping preparation comprising sugar, shortening, emulsifier and the water soluble globulin-anionic polyelectrolyte complex defined in claim 1.

References Cited
UNITED STATES PATENTS

| | | | |
|---|---|---|---|
| 2,824,092 | 2/1958 | Thompson | 260—112 X |
| 3,009,812 | 11/1961 | Ganz | 99—139 |
| 3,069,327 | 12/1962 | Eldridge | 99—91 X |
| 3,111,408 | 11/1963 | Cheng | 99—139 X |

A. LOUIS MONACELL, *Primary Examiner.*

J. M. HUNTER, *Assistant Examiner.*